(12) United States Patent
Suze et al.

(10) Patent No.: US 8,403,268 B2
(45) Date of Patent: Mar. 26, 2013

(54) PILOT CHUTE DEVICE

(75) Inventors: Gael Suze, Trie-Chateau (FR); Philippe Besnier, Chimiltin (FR)

(73) Assignee: Aerazur, Plaisir Cedex (FR)

( * ) Notice: Subject to any disclaimer, the term of this patent is extended or adjusted under 35 U.S.C. 154(b) by 353 days.

(21) Appl. No.: 12/833,238

(22) Filed: Jul. 9, 2010

(65) Prior Publication Data

US 2012/0006944 A1 Jan. 12, 2012

(51) Int. Cl.
*B64D 17/64* (2006.01)

(52) U.S. Cl. ............ 244/149; 244/148; 244/138 R; 244/147

(58) Field of Classification Search ........... 244/138 R, 244/139, 145, 147, 148, 149, 151 A, 151 B, 244/900–904

See application file for complete search history.

(56) References Cited

U.S. PATENT DOCUMENTS

| | | | |
|---|---|---|---|
| 2,949,263 A | * | 8/1960 | Steinthal ............. 244/113 |
| 3,693,917 A | | 9/1972 | Collec |
| 5,722,619 A | | 3/1998 | Cottle |

* cited by examiner

*Primary Examiner* — Tien Dinh
*Assistant Examiner* — Nicholas McFall
(74) *Attorney, Agent, or Firm* — Bachman & LaPointe, P.C.

(57) ABSTRACT

A pilot chute device is connected to a parachute canopy for deploying the parachute canopy out of a container adapted to be closed and opened and within which the parachute canopy is foldable. The pilot chute device includes an inflatable pilot chute adopted to assist the deployment of the parachute canopy, the inflatable pilot chute being foldable into the container, and a spring device adopted to push the inflatable pilot chute outside the container when the container is opened. The spring device is dispensed apart from the inflatable pilot chute, between the pilot chute and the parachute canopy.

20 Claims, 8 Drawing Sheets

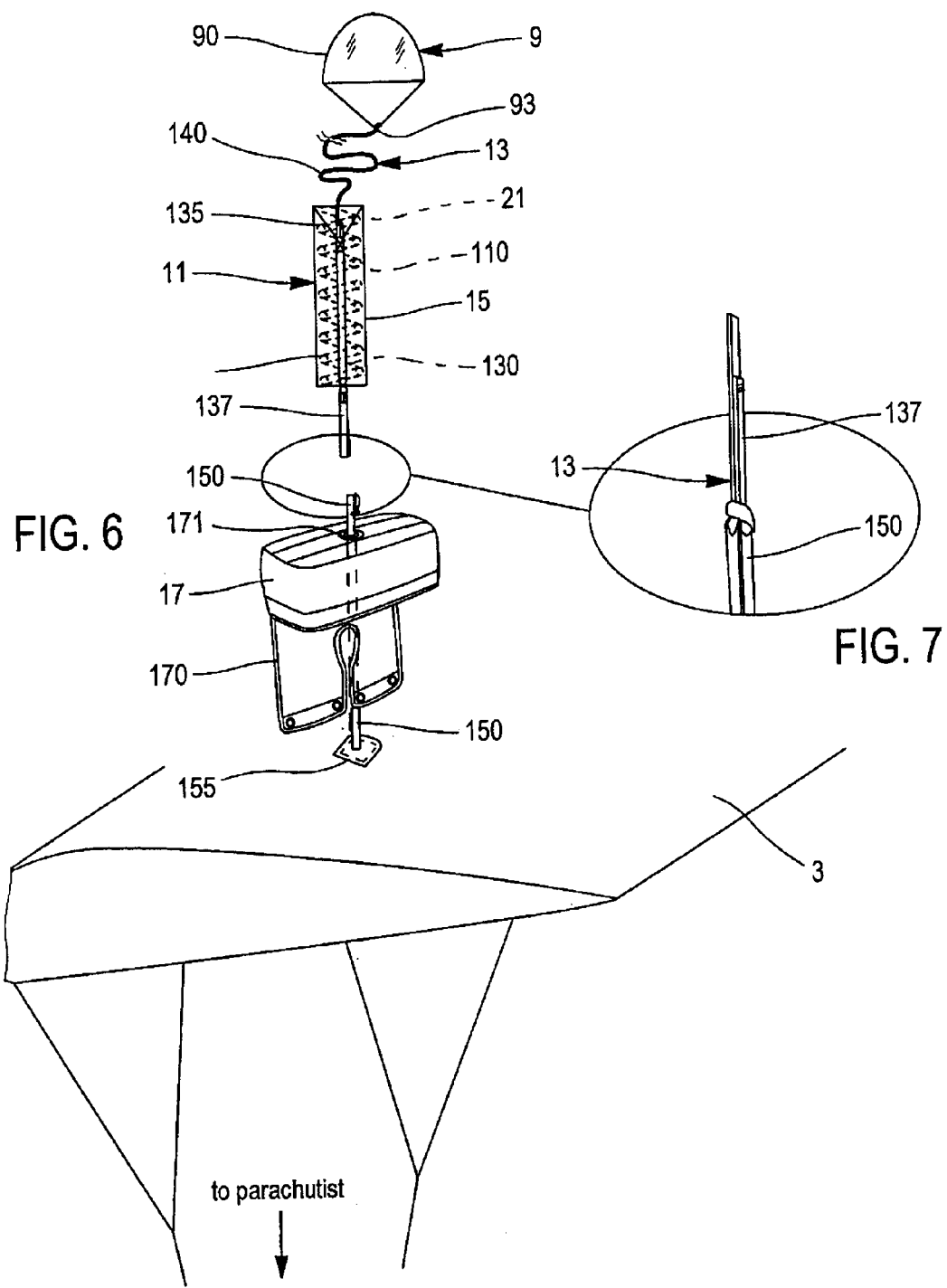

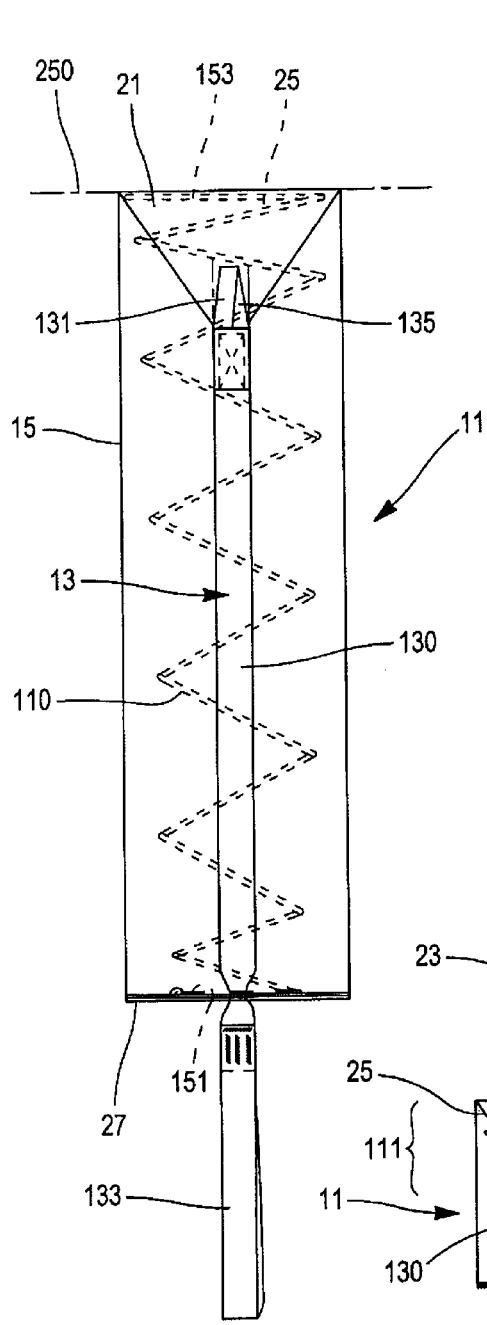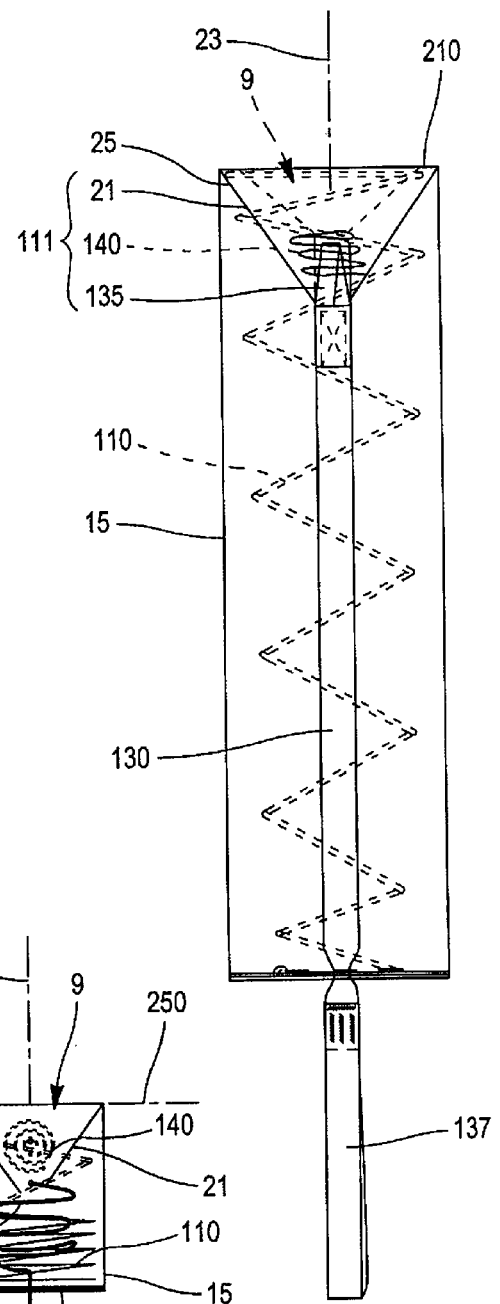
FIG. 8
FIG. 10
FIG. 9

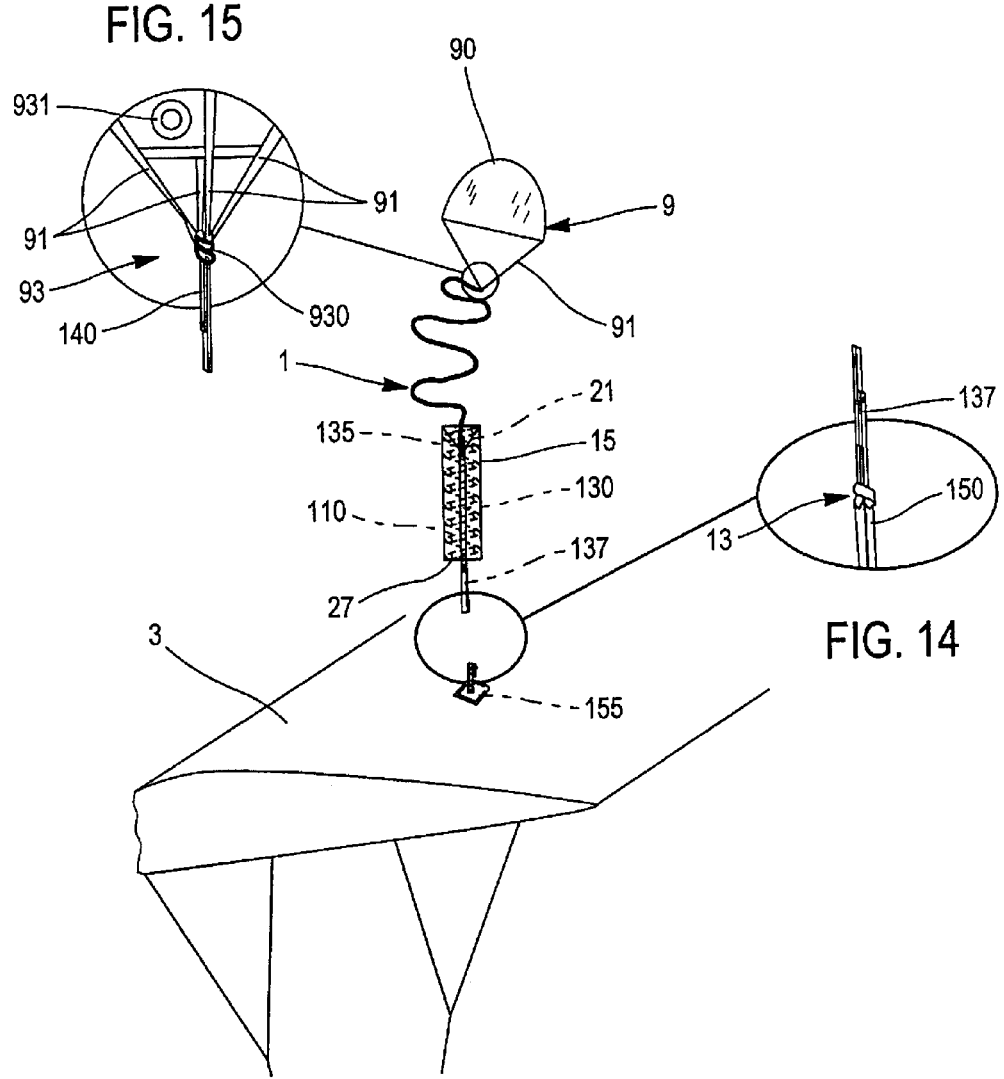

PILOT CHUTE DEVICE

FIELD OF THE INVENTION

The invention refers to a pilot chute device, also called extractor device. This is one of the security elements for a parachutist.

BACKGROUND

Such a device is connected to a parachute canopy for deploying the parachute canopy out of a container adapted to be closed and opened, typically a harness container.

The parachute canopy is foldable in said container.

In the art, such a pilot chute device typically comprises:

a inflatable, typically soft pilot chute adapted to assist the deployment of the parachute canopy, the inflatable pilot chute being foldable and adapted to be packed into the so-called container, and spring means adapted to push the inflatable pilot chute outside the container when said container is opened.

U.S. Pat. No. 3,693,917 illustrates a solution of such a pilot chute device, and in U.S. Pat. No. 5,722,619 is disclosed a spring loaded pilot chute; a spring is disposed within the pilot chute structure and said structure is connected by a bridle to the canopy to be deployed.

Below, traversing drawbacks linked to the inertia induced by the weight of the spring means when said spring means is propelled outside the container, into the airstream is expected.

Potential retention, including strangulation, of the bridle which the pilot chute device is attached to is also concerned.

Are further concerned:

ergonomics concerning the disposition of the elements disposed (folded) within the so-called container, technical control of the security elements by the parachutist, the possibility of automation of the pilot chute device extraction out of said so-called container.

As a complement to the above-cited drawbacks, it is recommended to traverse what follows, in relation to risks existing with prior art spring loaded pilot chutes: At the terminal free fall velocity, an air depression is created just above the back of the parachutist, when said parachutist is in the standard flat position (horizontal, chest downwardly oriented). The drag involved by the pilot chute device when expelled from the container is then very low. Such an inappropriate situation can even be stressed, for example in case of an AFF (Accelerated Free Fall) jump. As a consequence, if the expelling force created by the detent of the spring, when it springs out of the container, does not exceed the inertia induced by the weight of the spring before the canopy part of the pilot chute gets the relative wind, then the pilot chute device, together with the pilot chute bridle, fall down on the parachutist back, for an undetermined duration of time.

As long as the pilot chute device does not slip, or fall, out of said area of low pressure and recovers a quite high relative wind, the pilot chute device is inactive.

The consequences are as follows:

the parachutist remains in an inappropriate (potentially dangerous) free fall, the deployment of the canopy which the pilot chute device is connected to be deployed, potentially the pilot chute bridle can interfere with the pilot chute device; strangulation can occur, the canopy remains undeployed; this is dramatic.

SUMMARY

The following generic terms have the following meanings:

"bridle means" means at least one bridle made in one elementary bridle or a plurality of elementary bridles, such as in the present specification the so-called first, second and/or third elementary bridles. Further, said bridle means can comprise bridle(s), cable(s), line(s), webbing(s), strap(s) . . . . Using the first, second and third bridles referenced below is a recommended choice.

"spring means" means at least one of any flexible device that will return to its original shape when stretched, such as a spring, compression spring, torsion spring, flexion spring. A spiral compression spring is a recommended choice, "parachute canopy" means a main canopy or a reserve canopy, "harness container" means a backpack that holds the main canopy and the reserve canopy. This container also includes thick shoulder and leg straps that keep the container firmly attached to the parachutist.

With a view to providing a valuable solution to at least some of the above-cited drawbacks, it is recommended to use a pilot chute device comprising:

the above-cited inflatable, typically soft pilot chute adapted to assist the deployment of the parachute canopy, the inflatable pilot chute being foldable and adapted to be packed into the so-called container, and said spring means adapted to push the inflatable pilot chute outside the container when said container is opened, the spring means having the specificity of being disposed apart from the inflatable pilot chute, between said pilot chute and the parachute canopy to be deployed.

Preferably, the inflatable pilot chute will be removably connected to the parachute canopy by means of a bridle means passing through the spring means.

Especially, risks of strangulations will be reduced.

In the same way and/or for sake of security, ergonomics and limitation of mechanical interferences between the bridle means and the spring means, it is further recommended that said spring means comprises a (distortable) spring adapted to be stressed and unstressed and a flexible sheath within which said spring is disposed so that said sheath is deformed with the spring.

Advantageously, the flexible sheath will comprise a housing within which the inflatable pilot chute can be folded.

For improving the overcoming of the above-cited drawbacks, it is also recommended that the spring be a compression spring adapted to be compressed and expanded along a determined direction, and the housing, which is flexible (deformable), be disposed within the compression spring, at an end thereof along said determined direction.

In the same way, together with using the above-cited (distortable) spring located within the so-called flexible sheath, what follows is preferred, possibly in combination:

said flexible sheath:

can be deformed by the spring along a determined direction, has, along said determined direction, a first end and a second end, and comprises:

at said first end, a base plate which the spring is fixed to, and, at said second end, a housing extending within the flexible sheath and within which the inflatable pilot chute can be folded.

in the stressed state, the spring reserves within the flexible sheath a space opened outside (towards the airstream) and adapted to receive the housing within which is folded the inflatable pilot chute, the so-called bridle means comprises a first bridle passing through the spring and the flexible sheath, and preferably the first bridle, which has a first end and a second end, comprises loops at both said first and second ends for connecting there a second bridle connected to the inflatable, soft pilot chute and to a third bridle connected to the parachute canopy, respectively, the inflatable pilot chute is connected to the bridle by means of a detachable connection and said bridle has a length comprised between 0.8 m and 2.5 m, with a view to allowing the propelled soft pilot chute to be exposed to proper relative wind area, as detailed below.

According to another approach for traversing at least some of the above-cited drawbacks, is also concerned a pilot chute device comprising:

connection means for connecting said pilot chute device to a parachute canopy, to assist the deployment thereof, an inflatable, soft pilot chute, a spring adapted to be stressed and unstressed, and adapted to propel the inflatable, soft pilot chute at a distance therefrom when unstressed after having been stressed, a flexible sheath within which said spring is disposed so that said flexible sheath is deformed with the spring, and comprising an inner housing within which the inflatable pilot chute can be folded, apart from the spring.

According to a further approach for traversing at least some of the above-cited drawbacks, is furthermore concerned a pilot chute device comprising:

an inflatable pilot chute adapted to assist the deployment of the parachute canopy, the inflatable pilot chute being foldable into said container, spring means adapted to expel the inflatable pilot chute out of the container when said container is opened, and, bridle means connecting the inflatable pilot chute to the spring means.

Preferably, the bridle means will comprise a bridle.

Additional features and advantages of valuable solutions providing improvements with respect to the background will further be revealed in the following description referring to some illustrated embodiments.

Especially, in conformity with FIG. 18 below, it will be explained that, in this embodiment, said spring means, which are adapted to be compressed and expanded, are compressed within the above-cited container by means of a locking loop connected at one end to said container and passing successively through the spring means, the pilot chute and grommets provided on flaps adapted to close and open the container, the locking loop being releasably locked for closing the flaps by means of locking means connected to a ripcord handle adapted to be operated by the parachutist.

BRIEF DESCRIPTION OF THE DRAWINGS

FIGS. 6, 7 are details about the best mode in which a DEPLOYMENT BAG is used; FIG. 7 is an enlarged detail of FIG. 6 showing attachment between two bridles;

FIGS. 8, 9 show views of the spring means; FIG. 8 with no inflatable pilot chute, FIG. 9 with said inflatable pilot chute folded within the top housing;

FIG. 10 shows the spring means axially compressed or folded as shown in FIG. 1;

FIG. 12 is an enlarged detail of FIG. 11 showing attachment between two bridles;

FIGS. 13, 14, 15 are details about another embodiment in which in which a direct connection is used, with neither intermediate deployment bag nor canopy sleeve; FIG. 14 is an enlarged detail of FIG. 13 showing attachment between two bridles; FIG. 15 is also an enlarged detail of FIG. 13 showing attachment between the soft pilot chute and a bridle;

DETAILED DESCRIPTION OF THE PREFERRED EMBODIMENTS

Figure 1:
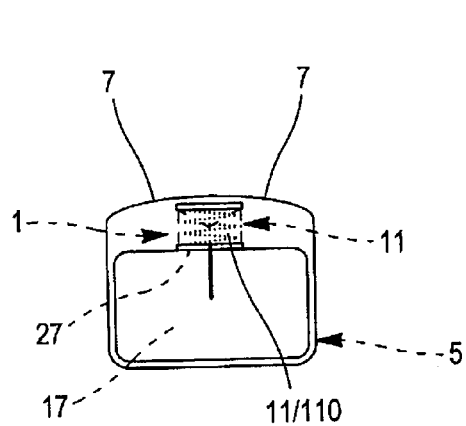
FIG. 1, 2, 3, 4 show successive steps for opening a canopy while using a security pilot chute device.

FIGS. 1-7 show the opening of a pilot chute device 1 connected to a parachute canopy 3 for deploying said parachute canopy out of a harness container 5, in the case in which a deployment bag 17 (sometimes called parachute opening bag, or extractor device container, or D bag) is used.

The harness container 5 has flaps 7 (often called rig container flaps) for closing and opening it. It is adapted to be hold by the parachutist 10, on his back; see FIG. 5.

The pilot chute device 1 comprises a inflatable pilot chute 9 (also called soft pilot chute) adapted to assist the deployment of the parachute canopy 3, and a spring means 11 adapted to push the inflatable pilot chute 9 outside the harness container 5, when said container is opened.

Both the parachute canopy 3 and the inflatable pilot chute 9 are foldable and adapted to be disposed, in the folded state, into the harness container 5.

In conformity with the best mode, the spring means 11 is disposed apart from the inflatable pilot chute 9, between said pilot chute and the parachute canopy 3.

Figure 16:
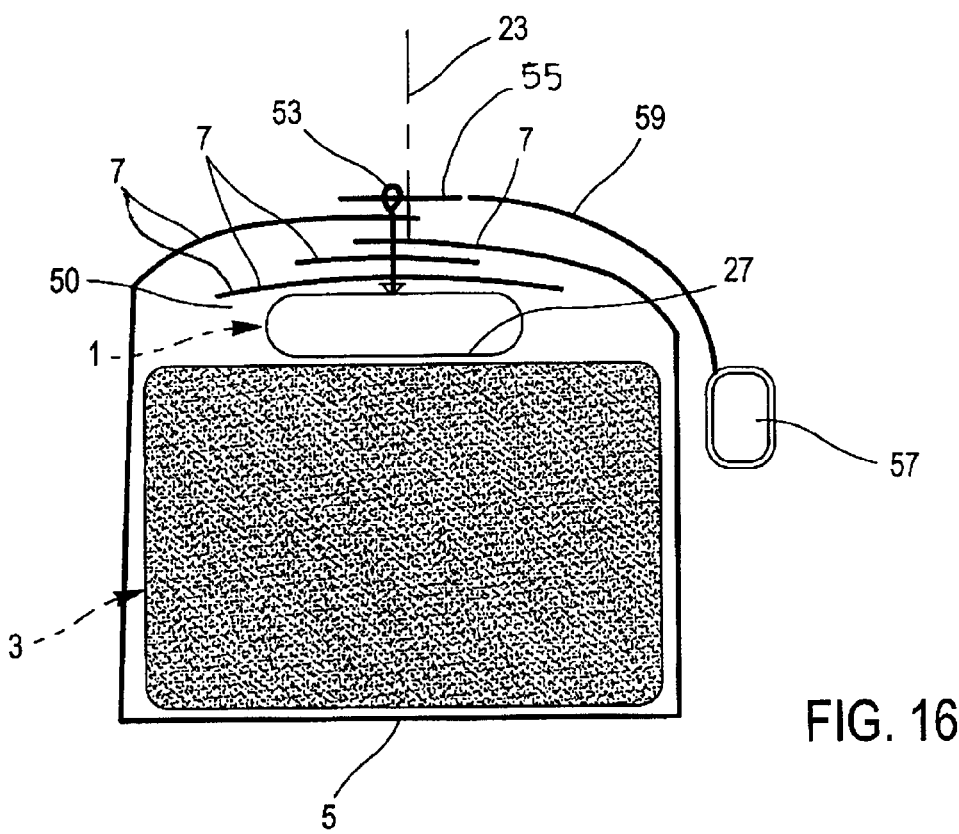
FIG. 16 shows a harness container containing the above-cited pilot chute device according to one of the cited embodiments.
Figure 17:
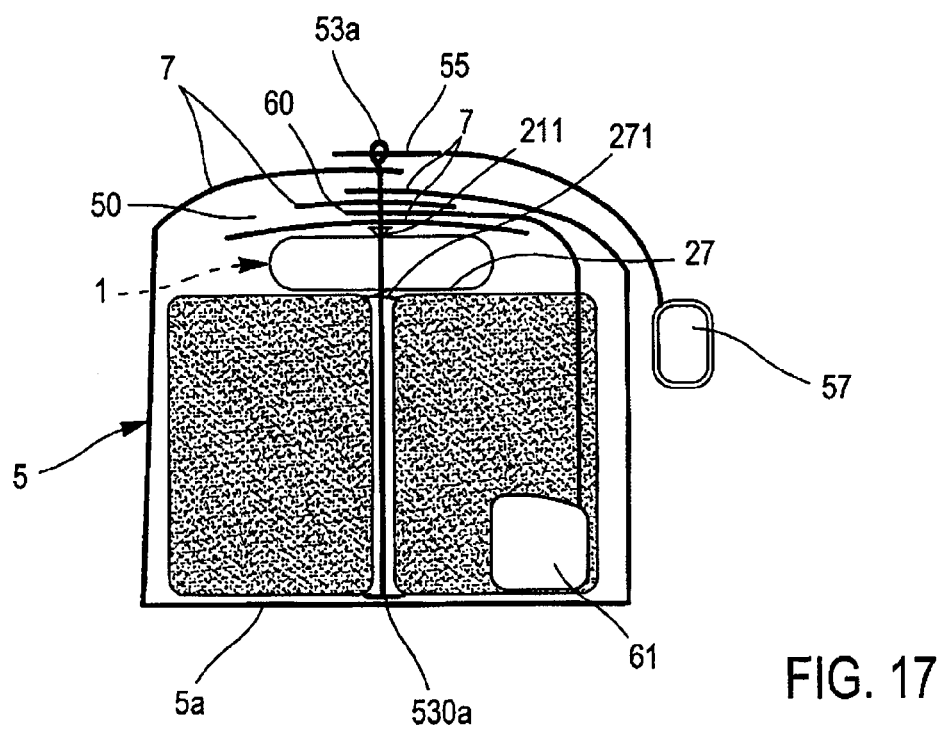
FIG. 17 shows an alternative disposition of the folded pilot chute device within the above harness container; and, FIG. 18 shows an alternative embodiment of the security pilot chute device, while using the alternative disposition of FIG. 17.

When the parachutist pulls a ripcord handle, such as the handle referenced 57 in FIGS. 16, 17, or when an automatic activation device (known in the art as AAD) is used for opening the main or reserve canopy container, the pilot chute device 1 has the function of extracting the parachute canopy 3 out of the harness container 5.

Therefore, bridle means 13 connect the soft pilot chute 9 and the parachute canopy 3 and are used for transmitting the effort therebetween.

Preferably, the bridle means 13 are removably connected to the parachute canopy 3 and are passing through the spring means 11. The bridle means 13 can notably be piece(s) of nylon webbing or strap(s).

In the illustrations, such as in FIGS. 8-9, said spring means 11 comprise a distortable spring 110 adapted to be stressed and unstressed and a flexible sheath 15 within which spring 110 is disposed and attached.

When unstressed after having been stressed, spring 110 is adapted to propel the soft pilot chute 9 at a distance from sheath 15.

As a consequence, the sheath 15 is deformed with, and by, the spring 110. Sheath 15 is advantageously soft and preferably a netting sleeve. It prevents the bridle means 13 from interfering with the spring 110.

In FIGS. 1-7, the connection by the bridle means 13 between the inflatable pilot chute 9 and the parachute canopy 3, is indirect, through the deployment bag 17. The connection is still indirect in FIGS. 11, 12: got through the canopy sleeve 19. On the contrary, it is a direct connection in FIGS. 13, 14.

Other possible indirect connections exist.

In the figures, the bridle means 13 comprise a first bridle 130 passing through both the spring 110 and the flexible sheath 15.

Such a solution limits the risks of strangling the bridle means 13 when the pilot chute device 1 is deployed, and offer an embodiment for connecting, by means of a bridle, the inflatable pilot chute 9 and the spring means 11.

In the preferred embodiment as illustrated in FIGS. 8-9, the first bridle 130 has a first end 131 and a second end 133. Further, it advantageously comprises loops 135, 137 at both said first and second ends for connecting there a second bridle 140 and a third bridle 150, respectively. The second bridle 140 is connected to the soft pilot chute 9, whereas the third bridle 150 is connected to the parachute canopy 3.

Figures 11, 12:
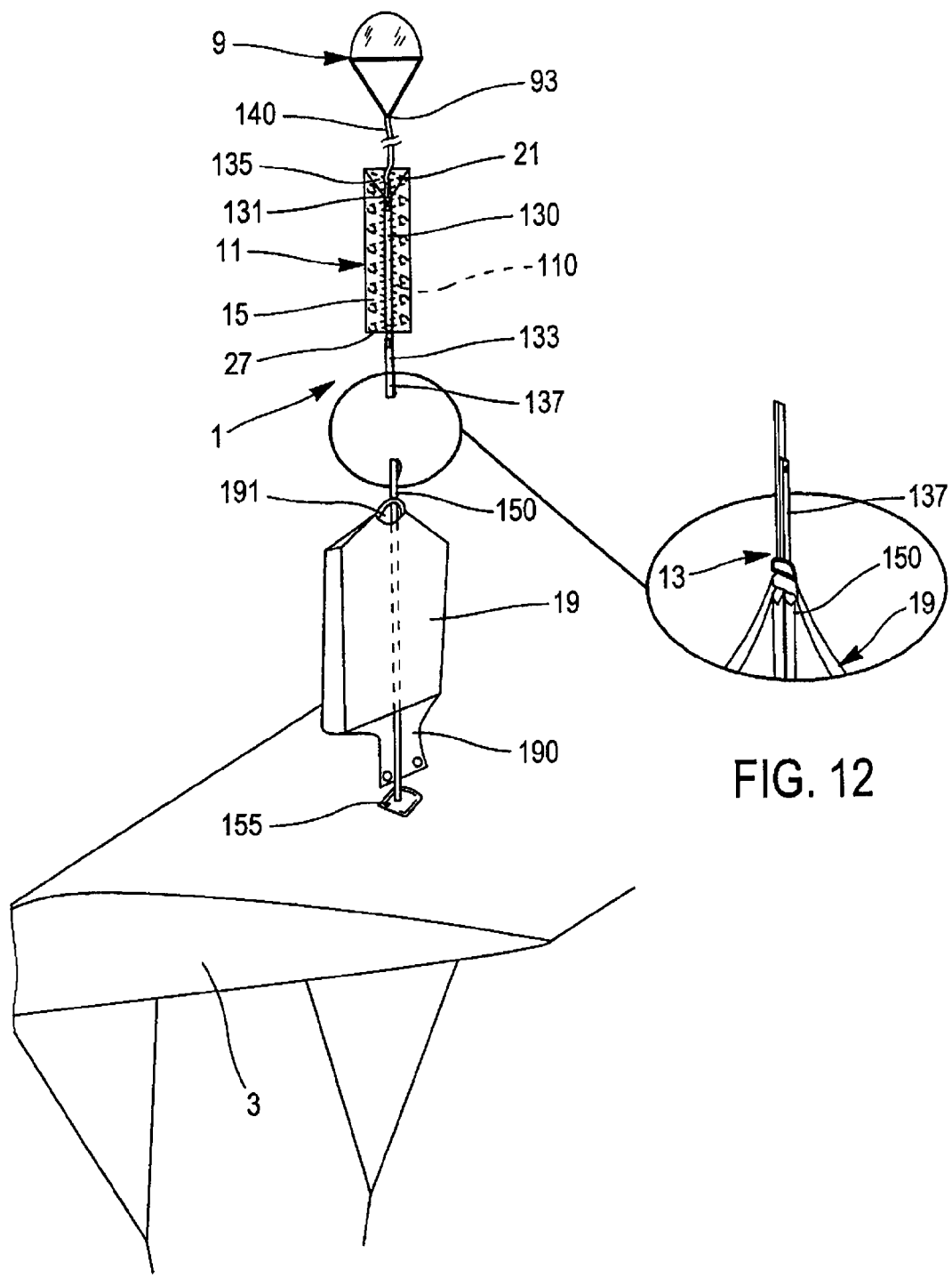
FIGS. 11, 12 are details about an embodiment in which a canopy sleeve is used, instead of the deployment bag.

Connections at loops 135, 137 can be made through lark's head knots (see FIGS. 7, 12, 14 for bridles 137, 150). As illustrated in FIGS. 6, 9, 11, 13, it is preferred that loop 135 at said first end be located within a housing whereas loop 137 at second end be located outside the flexible sheath 15.

For adapting and make easier said connections, the bridle means connections will preferably be detachable.

For securing air intake within the inflatable pilot chute 9, bridle 140 will preferably have a length comprised between 0.8 m and 2.5 m. (in FIG. 4, distance L1 between attachments 135 and 93). Preferably said length $\overline{L1}$ will be higher than 1.20 m, and even 1.5 m. Operationally, this length will be adapted as a function of the length L2 (FIG. 4) of the spring means 11, axially, since length of the bridle 150 is typically predetermined. It will be advantageous that global length L3 (L1+L2+cumulated lengths of bridles 137, 150) be comprised between 1.5 m and 3.5 m, preferably between 2.00 m and 3.00 m. Typically, the respective above lengths will be adapted with a view to allowing the inflatable pilot chute 9 to be, as far as possible, propelled or ejected out of the container, by the spring means 11, in an airstream stabilised enough for preventing device 1 from being biased downwardly by the depression airstream, as illustrated FIG. 3 where the inflatable pilot chute 9 was sufficiently so propelled that it is now out of the critical depression zone 100. As a consequence, the propelled soft or inflatable pilot chute will then be exposed to proper relative wind area.

Connection of the third bridle 150 to the parachute canopy 3 can include sewing; reference 155 (see FIGS. 7, 11, 13). Connection (reference 930) of the second bridle 140 to the inflatable pilot chute 9 is detailed in FIG. 15; the connection can be the same in FIGS. 7, 10.

In FIGS. 13, 15 considered together, the soft pilot chute 9 is shown as comprising an upper portion defining a canopy 90 and a lower portion defining a base 91. Canopy 90 can be hemispherical. Base 91 can comprises lines, especially made of Nylon™ and attached to the canopy 90. Base 91 includes an attachment means 93 for said connection between the soft pilot chute 9 and the bridle means, presently the second bridle 140. Attachment means 93 can comprise a tape loop 930 to which the second bridle 140 can be attached by a connecting loop made at an end of said second bridle.

In FIG. 6, the deployment bag 17 is shown opened: its closing flap 170 is drooping downwards. Third bridle 150 is passing through a grommet 171 provided through said deployment bag 17, at the opposite of the closing flap 170.

In the same way, in FIG. 11, the canopy sleeve 19 is shown opened: its closing flap 190 is drooping downwards. Third bridle 150 is passing through an opening 191 provided through said canopy sleeve, at the opposite of the closing flap 190.

Below connection 155, the parachute canopy 3 extends.

Depending on the selected embodiment, the canopy sleeve 19 or deployment bag 17 containing its parachute canopy 3 is adapted to be packed, or rigged, within the harness container 5, in a volume reserved therefore (often called as a dedicated rig).

Reverting notably to FIGS. 8-10, it can be noted that the flexible sheath 15 preferably comprises the flexible housing 21 within which the inflatable pilot chute 9 can be folded, to be packed therewith in the harness container 5 (see FIG. 10).

As a consequence, folding pilot chute 9, preferably together with second bridle 140, will be feasible apart from spring 110, with no risks of interference therebetween, even when sheath 15 and spring 110 are deformed; see FIGS. 1, 10.

A flexible sheath 15 is having a cylinder shape is adapted. A conical or frustoconical housing is also adapted. A housing 21 as a reinforced Nylon™ web is preferred.

As illustrated, it is further recommended that spring 110 be a compression spring adapted to be compressed and expanded along direction 23. In the illustration, direction 23 is the axis of the cylindrical flexible sheath 15. Housing 21, which is flexible, viz. deformable, is disposed within the compression spring 110, at an end 111 thereof along direction 23.

Comparison between FIGS. 1, 8-9 and 2, 10 clearly shows that spring 110 is preferably distortable in a stressed state in which, within the flexible sheath and preferably at an end thereof, said spring reserves a space 25 opened outside (on the airstream). Space 25 is adapted to receive housing 21 within which is then folded the inflatable pilot chute 9 (FIGS. 8-10).

Specifically, for improving efficiency and reliability, housing 21 will be disposed at an end of sheath 15 along direction 23 and will have a free opening 210 at its larger top end, with a view to offering a natural deployment opportunity to expand the soft pilot chute 9 when propelled by spring means 11: when spring means 11 falls down after having been naturally propelled upwardly in the airstream, airflow naturally tends to push soft pilot chute 9 (which is light) outside housing 21, together with second bridle 140 folded below.

Advantageously, as illustrated FIG. 10, the respective volumes of housing 21 and soft pilot chute 9, together with second bridle 140, will be adapted so that, spring 110 in the stressed state and sheath 15 flattened (see FIG. 3), both the folded soft pilot chute 9 and said second bridle 140 will be entirely contained within housing 21. And said housing 21 will then be housed within the latest turns (end) of the compression spring 110, with no projection out of the distal plane 250 of sheath 15 passing by said free opening 210, transversally to direction 23; see FIGS. 8, 9 considered together.

Further, for offering to spring 110 a support at one end, with a view to having a detent oriented to the opposite, along direction 23, a base plate 27 which the spring 110 is fixed to is provided. Said base plate is rigid and can be a crown plate.

As a consequence, globally, it is recommended that the flexible sheath 15:
be deformable and deformed by spring 110 along direction 23, have, along said direction, first and a second ends, 151, 153, respectively,
and comprise:
at said first end, base plate 27 which spring 110 is fixed to, and,
at said second end, housing 21 extending within the flexible sheath (preferably within the end turns of spring 110) and within which the inflatable pilot chute 9 can be folded.

The above-described pilot chute device 1 can notably be packed in conformity with the illustration of FIG. 16.

The parachute to be deployed, such as parachute canopy 3, or another main or reserve parachute, is at first folded and packed in an appropriate volume reserved in the harness container 5.

FIG. 16 shows parachute canopy 3 directly packed within the harness container 5. If useful, it however could at first be folded and packed in the above-cited deployment bag 17, or canopy sleeve 19.

Above the parachute canopy 3, also packed within the harness container 5, is the pilot chute device 1 in the folded (rigged) state: inflatable, soft pilot chute 9 and spring means 11 are flattened along direction 23.

The distortable spring 110 is then axially compressed (direction 23), flexible sheath 15 flattened, while enclosing the folded soft pilot chute 9 and bridle means, presently the second bridle 140, housed within housing 21. In other words, the pilot chute device 1 in the axially folded state of FIG. 10, with loop 137 attached to bridle 150 itself attached to canopy 3. The base plate 27 is downwardly disposed, facing the parachute canopy 3, whereas opening 230 is on the top, facing the opening 50—upwardly oriented—of the harness container 5. Flaps 7 for opening and closing opening 50 of the harness container 5 are closed above the pilot chute device 1 (especially the folded soft pilot chute 9) and retained by a locking loop 53.

Locking loop 53 passes through grommets of the flaps and is attached to a locking means 55, such as a locking, or ripcord, pin, connected to the ripcord handle 57 disposed outside the harness container 5 and accessible for the parachutist, with a view to be pulled thereby for deploying canopy 3. In the embodiment, cable 59 connects the ripcord handle 57 to the locking means 55.

Closed, the flaps 7 maintain spring means 11 in the stressed state, whereas the flexible sheath 15 is flattened, as illustrated FIG. 1.

The difference between FIGS. 16 and 17 consists in mounting the locking loop, now referenced 53a, and folding the pilot chute device 1 and the parachute canopy 3 (or packaging the latter, together with the above-cited deployment bag 17 or canopy sleeve 19).

In this embodiment of FIG. 17, the locking loop 53a is attached to the bottom 5a of the harness container 5 at its bottom 530a. Then the locking loop 53a is passed through the parachute canopy 3 and further, above it, through the folded pilot chute device 1.

Then the locking loop passes through the grommets of the flaps 7.

The same means as those cited with reference to figure can be used for locking the flap: locking means 55 connected to a ripcord handle 57.

A pyrotechnic or electro-pyrotechnic system can further be used, such as a pyrotechnic knife 60 adapted for cutting loop 53a and operated by a security trigger 61 which is an element of the automatic activation device.

Figure 18:
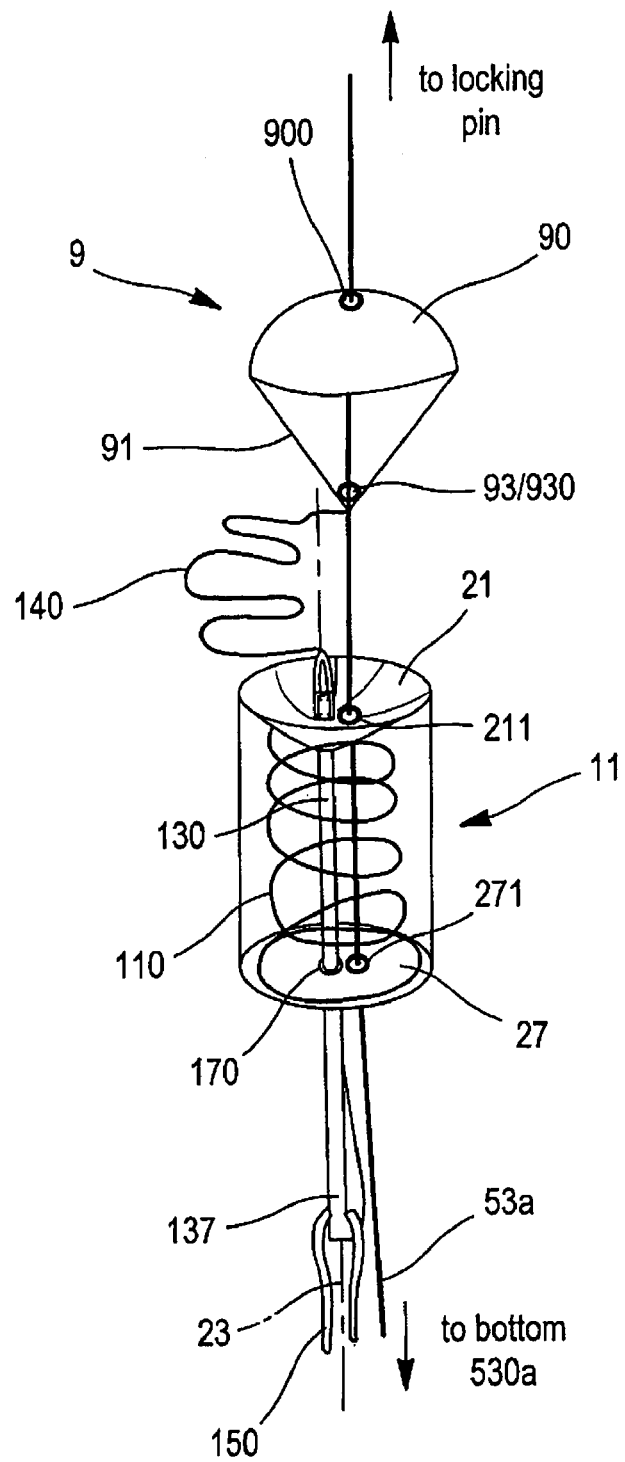

FIGS. 17-18 is illustrated a solution for routing the locking loop 53a through the pilot chute device 1.

As illustrated, coming from the bottom 530a, the locking loop 53a is passing through the spring means 11, apart from the first bridle 130.

FIG. 18, first bridle 130 is centrally disposed, on direction 23 and passes through housing 21 at one end and, freely, through a grommet 270 provided through the relatively rigid base plate 27, at the other end.

Slightly decentred is the locking loop 53a which is passing through grommets 211, 271 provided respectively through housing 21 and the relatively rigid base plate 27.

Outside the spring means 11, locking loop 53a extends then through the soft pilot chute 9. It can pass through the grommet 930 and then through a passage (such as a grommet) 900 made through canopy 90. Further upwardly, locking loop 53a pass through the flaps 7 of the harness container.

In such a solution (FIG. 18), a grommet (931 FIG. 15, which can consists in an air opening) could be disposed near the so-called tape loop 930 (reserved in this embodiment for attaching thereto the second bridle 140) with a view to guiding loop 53a by passing it through said grommet.

In both the embodiments of FIGS. 16 and 17, 18 operations of opening the parachute canopy are as follows, in conformity with FIGS. 1-4, considered successively.

The operator (parachutist) pulls on the ripcord handle 57. Locking means 55 unlocks the locking loop 53. Flaps 7 can open. Typically, opening 50 is then oriented upwardly, above the back of the parachutist.

Figure 2:
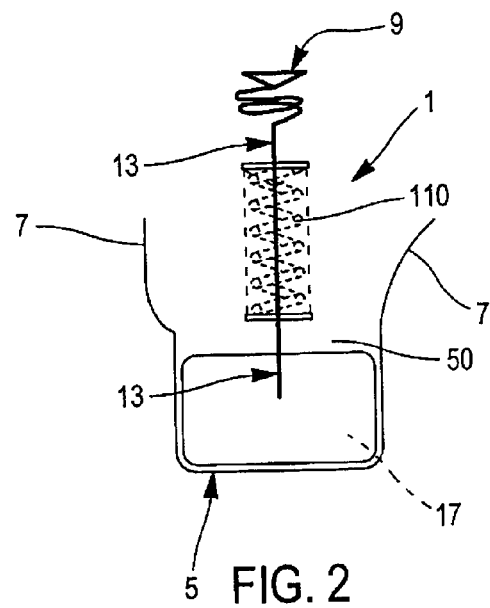

Supported on base plate 27, the spring means 11 expand upwardly, through opening 50 and, as a catapult, propels the inflatable pilot chute 9 in the airstream (FIG. 2).

Figure 3:
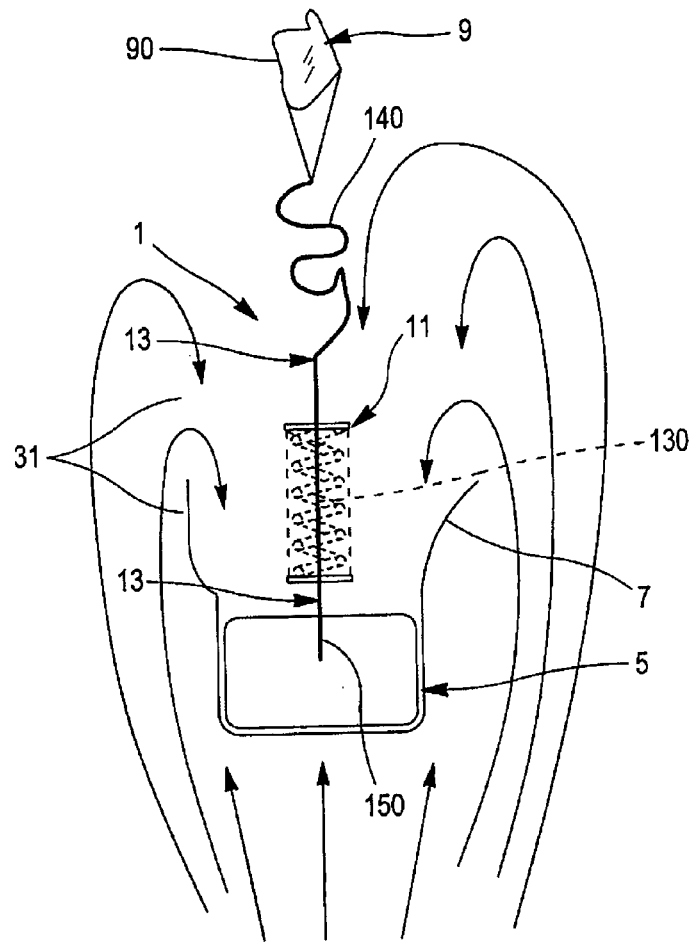
Figures 4, 5:
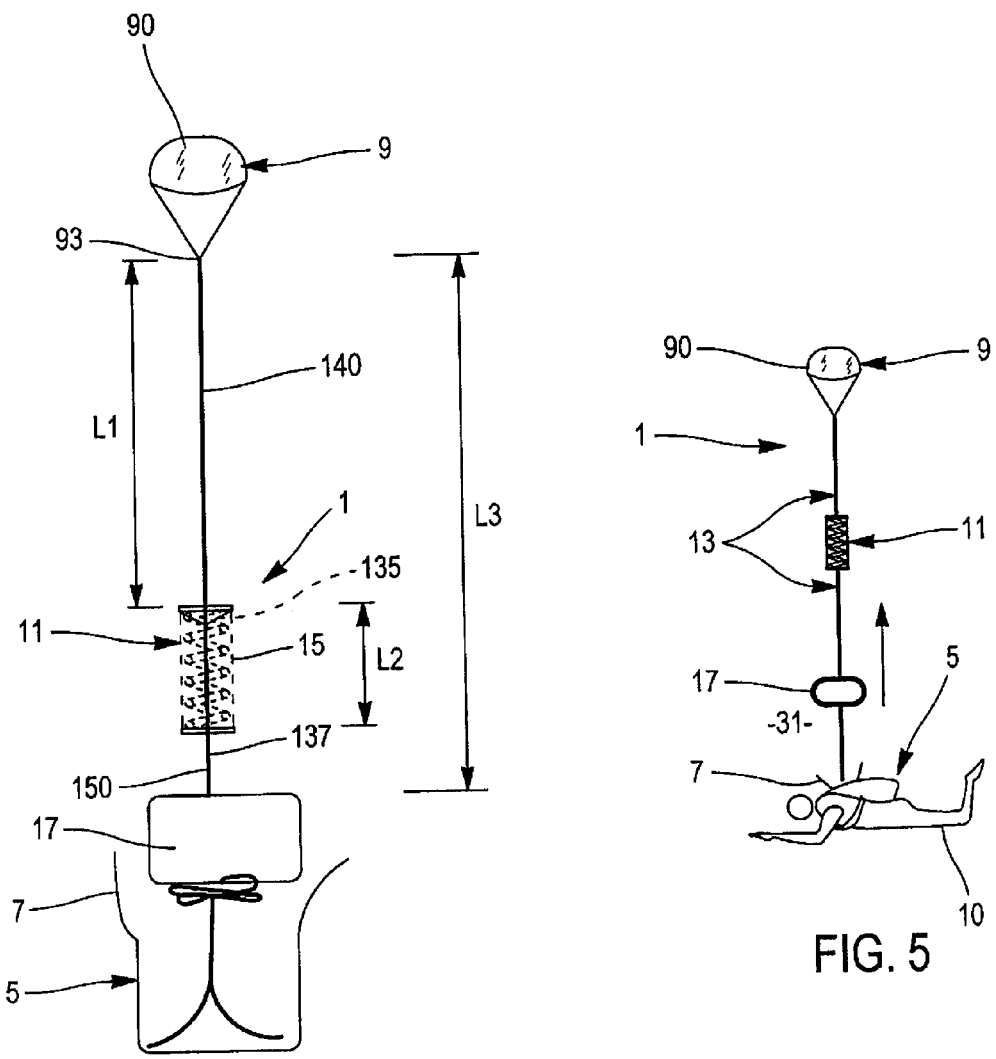
FIG. 5 shows the opening step when the soft pilot chute is inflated; In this embodiment, a deployment bag is also extracted above the harness container.

The power (strength) of spring means 11 and the length L of the second bridle 140 are adapted for propelling the inflatable pilot chute 9 out of the possible low pressure area 31 located just above the parachutist 10; see FIGS. 3, 5.

As a consequence, by reaction and the gravity, while parachutist 10 is falling (FIG. 5), the spring means 11 is extracted upwardly from the harness container 5 and catches the wind, followed by the parachute canopy 3 (FIGS. 6, 11, 13).

The invention claimed is:

1. A pilot chute device connected to a parachute canopy for deploying said parachute canopy out of a container adapted to be closed and opened and within which the parachute canopy is foldable, said pilot chute device comprising:
    an inflatable pilot chute adapted to assist the deployment of the parachute canopy, the inflatable pilot chute being foldable into said container,
    and spring means adapted to push the inflatable pilot chute outside the container when said container is opened, wherein the spring means are disposed apart from the inflatable pilot chute, between said pilot chute and the parachute canopy.

2. The pilot chute device according to claim 1, wherein the inflatable pilot chute is removably connected to the parachute canopy by means of bridle means passing through the spring means.

3. The pilot chute device according to claim 1, wherein the spring means comprise a spring adapted to be stressed and unstressed and a flexible sheath within which said spring is disposed so that said sheath is deformed with the spring.

4. The pilot chute device according to claim 3, wherein the flexible sheath comprises a housing within which the inflatable pilot chute can be folded.

5. The pilot chute device according to claim 4, wherein the spring is a compression spring adapted to be compressed and expanded along a determined direction, and the housing, which is flexible, is disposed within the compression spring, at an end thereof along said determined direction.

6. The pilot chute device according to claim 3, wherein the flexible sheath:
   is deformed by the spring along a determined direction,
   has, along said determined direction, a first end and a second end,
   and comprises:
      at said first end, a base plate which the spring is fixed to, and,
      at said second end, a housing extending within the flexible sheath and within which the inflatable pilot chute can be folded.

7. The pilot chute device according to claim 4, wherein the spring is distortable in a stressed state in which said spring reserves within the flexible sheath a space opened outside and adapted to receive the housing within which is folded the inflatable pilot chute.

8. The pilot chute device according to claim 2, wherein:
   the spring means comprise a spring adapted to be stressed and unstressed and a flexible sheath within which said spring is disposed so that said sheath is deformed with the spring,
   and the bridle means comprise a first bridle passing through the spring.

9. The pilot chute device according to claim 8, wherein the first bridle has a first end and a second end, and has loops at both said first and second ends for connecting there a second bridle connected to the inflatable pilot chute and to a third bridle connected to the parachute canopy, respectively.

10. The pilot chute device according to claim 4, wherein:
   the first bridle has a first end and a second end, and has loops at both said first and second ends for connecting there a second bridle connected to the inflatable pilot chute and to a third bridle connected to the parachute canopy, respectively, and,
   the loop at said first end is located within the housing and the loop at the second end is located outside the flexible sheath.

11. The pilot chute device according to claim 1, wherein:
   the inflatable pilot chute is connected to the spring means by means of a bridle, and
   the flexible sheath comprises a housing within which can be folded the inflatable pilot chute together with said bridle.

12. The pilot chute device according to claim 2, wherein the inflatable pilot chute is connected to the bridle means by means of a detachable connection and said bridle means have a length comprised between 0.8 m and 2.5 m.

13. The pilot chute device according to claim 1, wherein said spring means, which are adapted to be compressed and expanded, are compressed within said container by means of a locking loop connected at one end to the container and passing through the spring means, the inflatable pilot chute and grommets, said grommets being provided on flaps adapted to close and open the container, the locking loop being releasably locked for closing the flaps by means of locking means connected to a ripcord handle adapted to be operated by the parachutist.

14. The pilot chute device according to claim 1, wherein the inflatable pilot chute is connected by means of a second bridle to an end of a first bridle passing through the spring means, and said second bridle has a length comprised between 0.8 m and 2.5 m.

15. A pilot chute device comprising:
   connection means for connecting said pilot chute device to a parachute canopy, to assist the deployment thereof,
   an inflatable pilot chute,
   a spring adapted to be stressed and unstressed, and adapted to propel the inflatable pilot chute at a distance therefrom when unstressed after having been stressed, and
   a flexible sheath within which said spring is disposed so that said flexible sheath is deformed with the spring, and comprising an inner housing within which the inflatable pilot chute can be folded, apart from the spring.

16. A pilot chute device connected to a parachute canopy for deploying said parachute canopy out of a container adapted to be closed and opened and within which the parachute canopy is foldable, said pilot chute device comprising:
   an inflatable pilot chute adapted to assist the deployment of the parachute canopy, the inflatable pilot chute being foldable into said container,
   spring means adapted to expel the inflatable pilot chute out of the container, along a determined direction, when said container is opened, and
   bridle means connecting the inflatable pilot chute to the parachute canopy through said container, with no attachment to said container.

17. The pilot chute device according to claim 16, wherein the spring means are disposed along said determined direction, apart from the inflatable pilot chute and the container, when said inflatable pilot chute is deployed.

18. The pilot chute device according to claim 16, wherein the bridle means comprise a bridle passing through the spring means and disposed along said determined direction, apart from said inflatable pilot chute and said container when said inflatable pilot chute is deployed.

19. A pilot chute device connected to a parachute canopy for deploying said parachute canopy out of a container adapted to be closed and opened and within which the parachute canopy is foldable, said pilot chute device comprising:
   an inflatable pilot chute adapted to assist the deployment of the parachute canopy, the inflatable pilot chute being foldable into said container,
   spring means adapted to expel the inflatable pilot chute out of the container, along a determined direction, when said container is opened, and
   bridle means connecting the inflatable pilot chute to the parachute canopy through said container, with no attachment to said container,
   said bridle means comprising a bridle passing through the spring means and being disposed along said determined direction, apart from said inflatable pilot chute and said container when said inflatable pilot chute is deployed.

20. The pilot chute device according to claim 19, wherein the spring means are disposed along said determined direction, apart from the inflatable pilot chute and the container, when the inflatable pilot chute is deployed.

* * * * *